United States Patent [19]
Holley

[11] Patent Number: 5,507,546
[45] Date of Patent: Apr. 16, 1996

[54] UNDERRIDE PROTECTION BUMPER

[76] Inventor: John D. Holley, 1872 Cherry St., Montgomery, Ala. 36107

[21] Appl. No.: 286,243

[22] Filed: Aug. 8, 1994

Related U.S. Application Data

[63] Continuation-in-part of Ser. No. 105,841, Aug. 13, 1993, abandoned.

[51] Int. Cl.[6] ................................................ B60R 19/34
[52] U.S. Cl. ........................ 293/133; 293/102; 188/5; 180/276
[58] Field of Search ........................... 293/2, 6, 102, 293/103, 133; 180/276; 188/5

[56] References Cited

U.S. PATENT DOCUMENTS

| | | |
|---|---|---|
| 528,298 | 10/1894 | Kerr . |
| 557,334 | 3/1896 | Moller ........................ 293/102 |
| 575,023 | 1/1897 | Brenizer . |
| 781,991 | 2/1905 | Bechtel, Jr. . |
| 1,191,957 | 7/1916 | Geraghty . |
| 1,392,625 | 10/1921 | Dimin . |
| 2,890,076 | 6/1959 | Baechler ........................ 293/140 |
| 3,472,332 | 10/1969 | Halvajian ........................ 296/6 X |
| 3,733,096 | 5/1973 | Kassbohrer ........................ 293/63 |
| 3,913,963 | 10/1975 | Persicke ........................ 293/15 |
| 4,105,237 | 8/1978 | Viall, Sr. et al. ........................ 293/73 |
| 4,247,138 | 1/1981 | Child ........................ 293/103 |
| 4,582,351 | 4/1986 | Edwards ........................ 293/118 |
| 4,979,770 | 12/1990 | Shal-Bar ........................ 293/131 |
| 5,016,933 | 5/1991 | Smit ........................ 293/117 |
| 5,257,842 | 11/1993 | Sherno ........................ 293/1 |

FOREIGN PATENT DOCUMENTS

| | | |
|---|---|---|
| 28958 | 5/1925 | France . |
| 944345 | 4/1949 | France . |
| 2832336 | 1/1980 | Germany . |
| 69135 | 6/1977 | Japan ........................ 293/103 |
| 1193616 | 6/1970 | United Kingdom . |

*Primary Examiner*—Dennis H. Pedder
*Attorney, Agent, or Firm*—William L. Feeney; Kerkam, Stowell, Kondracki & Clarke

[57] ABSTRACT

A vehicle and vehicle bumper provide protection against other vehicles underriding the vehicle. The bumper uses breakable links which break at a predetermined force. The bumper structure has a pivoting arrangement such that, upon breakage of the breakable links, the pivoting of the bumper tends to lift the rear of the vehicle which is being hit and tends to smash downward on the front end of the impinging vehicle, which might otherwise underride the vehicle having the present bumper. A method of using the bumper to prevent underride includes the smashing down and lifting up features.

23 Claims, 1 Drawing Sheet

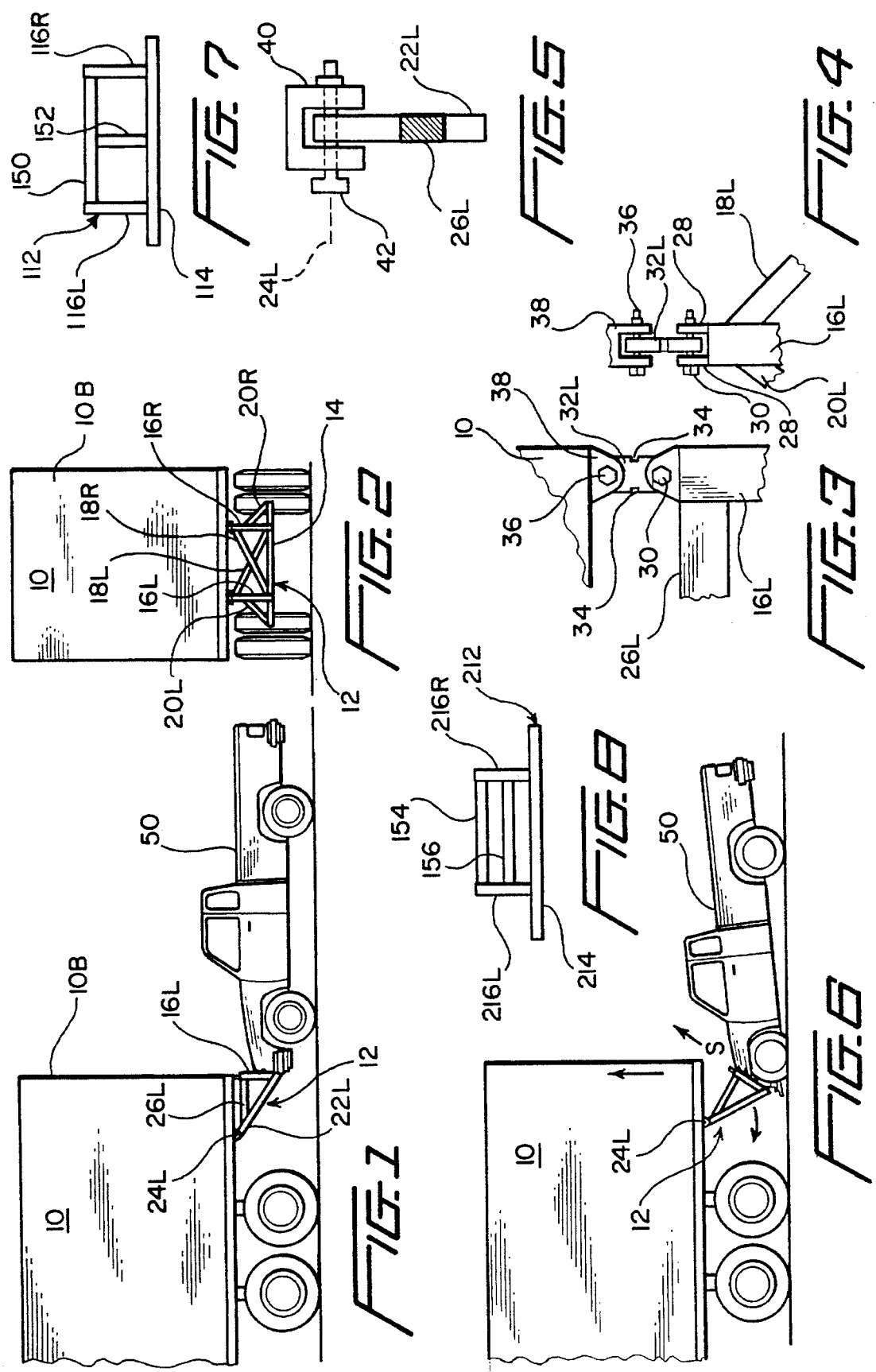

UNDERRIDE PROTECTION BUMPER

CROSS-REFERENCE TO RELATED APPLICATION

The present application is a continuation-in-part of the present inventor's co-pending U.S. application Ser. No. 08/105,841 filed Aug. 13, 1993, hereby incorporated by reference, and abandoned following the filing of the present application.

BACKGROUND OF THE INVENTION

The present invention relates to an underride protection bumper for a truck. That is, the present invention is a bumper for a truck which prevents or minimizes the possibility of another vehicle underriding the truck or similar vehicle. The present invention further relates to a truck or similar vehicle having such an underride protection bumper.

Truck semitrailers typically have an elevated floor. That is, the floor of such semitrailers is relatively high compared to the front end of cars and pickup trucks. Therefore, if a car or pickup truck hits the rear of a semitrailer or similar vehicle with an elevated floor, the front end of the car or pickup truck may travel under the floor of the semitrailer and the passenger compartment of the car or pickup truck may slam into the rear of the semitrailer body in such a way as to completely smash the upper half of the passenger compartment, often severely or fatally injuring those in the passenger compartment of the vehicle which is said to be underriding the truck semitrailer.

In order to minimize such underride collisions, trucks have used various bumpers. Although such bumpers have been useful, they generally collapse if the impinging vehicle is going at a sufficiently high speed, leading to an underride collision. A dilemma in the design of such bumpers is that making the bumper so strong as to not collapse also leads to severe injuries or fatalities to the passengers in the underriding or impinging vehicle. That is, if the bumper of the truck is so strong as to completely avoid underriding, the kinetic energy of the collision is generally forced back into the impinging vehicle. If the impinging vehicle is going at a sufficiently high rate of speed, this kinetic energy will cause severe, often fatal, injuries to the passengers. Thus, designing the bumper of a truck to have great strength will cause severe injuries from the kinetic energy being applied to the impinging vehicle, whereas designing the bumper to collapse at a sufficiently high rate of speed will cause the severe injuries and fatalities associated with an underride collision. In general, such bumpers are helpful if the differential speed between the impinging vehicle (the vehicle which may underride) and the truck semitrailer is below a particular value.

One kind of step bumper which has been used to try to minimize underride has the step bumper itself extending between two vertical posts, one mounted on each side of the rear of the semitrailer. The step bumper extends from side to side at the lower end of the vertical posts. A brace on each side extends up from the bottom of the vertical post forward and inclined at an angle towards the trailer. These inclined braces or side members on each side collapse if the impinging vehicle hits the bumper with too much speed.

Another design uses vertical posts mounted at each side of the rear of the vehicle, which vertical posts are hinged at the upper end to the top of the semitrailer. The bumper extends between the two vertical posts at the bottom of the vertical post. A crash shock absorber is mounted at each side of the bumper to absorb shock as the bumper is pushed towards the front of the semitrailer by an impinging vehicle. The impinging vehicle collapses the shock absorbers as the vertical posts pivot about their upper hinges or pivot points. Again, this may prevent underride if the impinging vehicle is going sufficiently slowly, but the shock absorbers will be overwhelmed if the differential speed between the impinging vehicle and the semitrailer is sufficiently high. The dilemma mentioned above would again be present in this design. If the crash shock absorbers were made sufficiently strong, underride collisions could be prevented even if the impinging vehicle is going relatively fast. However, in that case, the impinging vehicle would be absorbing huge amounts of kinetic energy as though the impinging vehicle had crashed into a brick wall. The passengers might be in no better condition than they would be if an underride collision had occurred.

Generally, such step bumpers of prior designs are made to withstand about 40,000 lbs. in force before collapsing. This might be equivalent to about 15 to 20 miles per hour differential speed between the impinging vehicle and the semitrailer for a typical car or pickup truck.

OBJECTS AND SUMMARY OF THE INVENTION

Accordingly, it is a primary object of the present invention to provide a new and improved underride protection bumper for a truck or similar vehicle.

A further object of the present invention is to provide a truck or similar elevated floor road vehicle having an underride protection bumper.

A specific object of the present invention is to provide an underride protection bumper which will minimize injuries to persons in an impinging vehicle at relatively high rates of speed.

A further object of the present invention is to provide an improved underride protection bumper which will cause energy to be dissipated in such a way as to minimize injuries to persons riding in an impinging vehicle.

Yet another object of the present invention is to provide an underride protection bumper which may be easily repaired after most collisions.

A further object of the present invention is to provide an improved underride protection bumper at little or no increase in cost.

The above and other objects of the present invention which will become apparent as the following detailed description proceeds are realized by an underride protection bumper for an elevated floor road vehicle. The bumper has: a framework including a bumper member at a first end; a first pivot member portion at a second end of the framework; and a first breakable link at the first end for breakably securing the framework to the road vehicle. The framework further includes: a first arm fixed to the bumper member and extending up therefrom to an upper end of the first arm; and a first inclined member having a lower end secured to the bumper member and an upper end. The first breakable link is attached to the upper end of the first arm and the first pivot member portion is mounted to the upper end of the first inclined member for pivotable attachment of the upper end of the first inclined member to a first anchor point, the first inclined member being inclined at an angle of 40 degrees to 50 degrees relative to a horizontal line.

The bumper has an impact area over which the front of an impinging vehicle may contact portions of the bumper, the impact area having a side height at two sides corresponding to a height of the first arm at two sides and having a height of at least one half the side height throughout a separation between the two sides. A pivoting of the bumper member and portions of the framework about the first pivot member causes the smashing down of the front end of the impinging vehicle with associated friction between the impinging vehicle and a road surface and tends to lift the road vehicle at a point adjacent to the first pivot member portion. The bumper has a swinging portion which pivots about an axis through the first pivot member portion and wherein the swinging portion has a maximum vertical height that is at least 80% of its maximum depth. (Vertical height on level surface and depth meaning front-to-back horizontal extent, both taken in normal or pre-crash position.)

The framework further includes a first brace extending from adjacent the upper end of the first arm to a point on the first inclined member between the upper and lower ends of the first inclined member. The framework further includes a second arm, a second inclined member, a second breakable link, and a second pivot member portion constructed and operable in identical fashion respectively to the first arm, the first inclined member, the first breakable link, and the first pivot member portion and mounted on an opposite side therefrom. The first pivot member portion is separate from the second pivot member portion. The framework further includes first and second cross-braces, each extending between an upper end of one of the first and second arms and a lower end of another of the first and second arms.

The underride protection bumper is combined with an elevated floor vehicle having a road vehicle structure to which the first pivot member portion and the first breakable link are mounted; and wherein the bumper is operable, upon a front end of an impinging vehicle hitting the bumper member at a sufficiently high speed, to sever the first breakable link such that the bumper member and at least some other portions of the framework pivot about the first pivot member portion; and wherein the first pivot member portion is disposed relative to a lower edge of the bumper member such that pivoting of the bumper member and portions of the framework about the first pivot member causes the smashing down of the front end of the impinging vehicle with associated friction between the impinging vehicle and a road surface and tends to lift the road vehicle at a point adjacent to the first pivot member portion.

The present invention may alternately be described as an elevated floor road vehicle having a road vehicle structure and underride protection bumper as described above. The bumper is operable, upon a front end of an impinging vehicle hitting the bumper member at a sufficiently high speed, to sever the first breakable link such that the bumper member and at least some other portions of the framework pivot about the first pivot member. The first pivot member portion is disposed relative to a lower edge of the bumper member such that pivoting of the bumper member and portions of the framework about the first pivot member causes the smashing down of the front end of the impinging vehicle with associated friction between the impinging vehicle and a road surface and tends to lift the road vehicle at a point adjacent to the first pivot member portion. The portions of bumper which pivot about the first pivot member portion can swing over angle S of at least 30 degrees (preferably at least 35 degrees, more preferably at least 40 degrees) without the bumper striking the ground. The bumper has a swinging portion which pivots about an axis through the first pivot member portion and wherein the swinging portion has a maximum vertical height that is at least 80% of its maximum depth. The first pivot member portion has a height which is greater than a swing radius of the portions of bumper which pivot about the first pivot member portion. The first inclined member is inclined at an angle of 40 degrees to 50 degrees relative to a horizontal line.

The present invention may alternately be described as an elevated floor road vehicle having a road vehicle structure and an underride protection bumper as described above. The bumper is operable, upon a front end of an impinging vehicle hitting the bumper member at a sufficiently high speed, to sever the first breakable link such that the bumper member and at least some other portions of the framework pivot about the first pivot member. The first pivot member portion is disposed relative to a lower edge of the bumper member such that pivoting of the bumper member and portions of the framework about the first pivot member causes the smashing down of the front end of the impinging vehicle with associated friction between the impinging vehicle and a road surface and tends to lift the road vehicle at a point adjacent to the first pivot member portion. The first pivot member portion has a height which is greater than a swing radius of the portions of framework which pivot about the first pivot member portion. The bumper is operable such that at any given time following the severing of the breakable link, the sum of vertical components of collision forces on an impinging vehicle are larger than any horizontal components of collision forces on the impinging vehicle.

The present invention may alternately be described as a method for blocking an impinging vehicle from underriding an elevated floor road vehicle, the steps including: mounting an underride protection bumper to an elevated floor road vehicle, the bumper including:

a framework including a bumper member at a first end; a first pivot member portion at a second end of the framework and securing the framework to the road vehicle structure; and a first breakable link at the first end for breakably securing the framework to the road vehicle structure;

severing the first breakable link upon a front end of an impinging vehicle hitting the bumper member at a sufficiently high speed such that the bumper member and at least some other portions of the framework pivot about the first pivot member;

smashing down of the front end of the impinging vehicle with associated friction between the impinging vehicle and a road surface by pivoting of the bumper member and the at least some other portions of the framework; and lifting the road vehicle at a point adjacent to the first pivot member portion by way of pivoting of the bumper member and the at least some other portions of the framework.

As used herein, a road vehicle is a vehicle designed for traveling upon highways or other roads. An elevated floor road vehicle is such a vehicle as a trailer of a semitrailer truck having a floor which is sufficiently high from the road that passenger vehicles such as cars or pickup trucks have front ends lower than the underside of the elevated floor.

BRIEF DESCRIPTION OF THE DRAWINGS

The above and other features of the present invention will be more readily understood when the following detailed description is considered in conjunction with the accompanying drawings wherein like characters represent like parts throughout the several views and in which:

FIG. 1 is a simplified side view of the present invention with an impinging vehicle;

FIG. 2 is a simplified back view of the present invention;

FIG. 3 is an enlarged side view of a portion of the present invention with parts broken away;

FIG. 4 is an enlarged back view of a portion of the present invention with parts broken away;

FIG. 5 is an enlarged back view of a pivot arrangement of the present invention;

FIG. 6 is a simplified side view, similar to FIG. 1, and illustrating the operation of the present invention;

FIG. 7 is a simplified back view of a portion of a second embodiment bumper; and FIG. 8 is a simplified back view of a portion of a third embodiment bumper.

DETAILED DESCRIPTION

Initially referring to FIGS. 1 and 2, a truck semitrailer 10 according to the present invention has a bumper 12 according to the present invention mounted thereon. The truck semitrailer 10 may be constructed in known fashion except for the unique bumper 12 mounted thereon, which bumper will now be described in more detail.

With reference primarily to FIG. 2, the bumper 12 includes a bumper member 14 which extends horizontally and which is positioned for being struck by a vehicle colliding into the bumper 12. Right and left arms 16R and 16L respectively have lower ends fixed to the bumper member 14 and extend vertically to be mounted on the body of the semitrailer 10 in a fashion which will be described in detail below. Right cross-brace 18R extends from the top of right arm 16R to the bottom of left arm 16L, whereas left cross-brace 18L is likewise fixed between the top of arm 16L and the bottom of arm 16R. A right back brace 20R extends between an intermediate point on right arm 16R and the right end of bumper member 14, whereas a similar left back brace 20L extends between left arm 16L and the left end of bumper member 14.

All of the members and braces thus far discussed would be disposed in vertical planes parallel to the plane of view of FIG. 2. In other words, all of the members between bumper member 14 and brace 20R and 20L extend either within the plane of the back 10B of semitrailer 10 or within planes which are parallel to the plane of the back 10B of semitrailer 10 and which are immediately adjacent to that plane. All of the members and braces discussed between and including bumper member 14 and braces 20L and 20R may be constructed of high strength steel and would be welded together at the various intersections between them. The members and braces may more specifically be square tubing having a three inch by three inch cross section or a four inch by four inch cross section for example. Other dimensions may of course be used.

Turning back to FIG. 1, various left side components, numbered with a L suffix, will be discussed. It will be understood that identical and corresponding right side structures are used on the right side of the rear of semitrailer 10. A left inclined member 22L is fixed to the lower end of arm 16L (or the bumper 14 immediately adjacent to the arm 16L). An upper end of the inclined left side member 22L is pivotably mounted at point 24L, the mounting being discussed in more detail below. A left side brace 26L extends from a point on the inclined member 22L below the pivot point 24L to the upper end of arm 16L. Member 22L and side brace 26L, which may be made of steel tubing as discussed above, form a triangle with arm 16L with the various components welded to each other. Of course, an upper end of inclined member 22L extends beyond the corner of the triangle. All of the three components which make up the triangle would be disposed in a vertical plane. The members, braces, and arms discussed constitute a rigid framework.

Turning now to FIGS. 3 and 4, the structure at the upper end of arm 16L will be discussed in detail, it being understood that identical structures would be mounted at the upper end of arm 16R. Mounted at the upper end of arm 16L are two parallel plates 28 forming a clevis whereby a bolt 30 holds a breakable link 32L to the member 16L, the bolt 30 extending through holes in registry in the two plates 28 and the lower end of breakable link 32L. As shown, the breakable link 32L may have notches 34 to encourage breakage at particular points in the link 32L. A bolt 36 holds the upper end of breakable link 32L within the parallel plates of a clevis 38. The bolt 36 holds the upper end of breakable link 32L in the same fashion as the bolt 30 holds the lower end of the breakable link 32L. Both of these connections are preferably double shear connections, meaning that the bolt 30 or 36 would have to break in two locations before the connection with the breakable link is severed. The clevis 38 would be welded or otherwise attached to the bottom of the floor of the semitrailer 10, such that link 32L secures bumper 12 to the floor portion of the structure of road vehicle 10.

Turning now to FIG. 5, the details of the pivot point 24L will be discussed, it being understood again that an identical structure would be located on the right side of the bumper 12. As shown, the upper end of inclined member 22L is pivotably connected to a clevis 40 by a bolt 42. The side brace 26L is shown in cross section. The clevis 40 would be welded or otherwise fixed to the floor of the trailer 10. Bolt 42 is in a double shear arrangement relative to the clevis 40. As shown in FIG. 1 and will be understood from the previous indication that left arm 16L is vertical, a lower end of arm 16L has a horizontal offset from said first pivot member portion or bolt 42 no greater than a horizontal offset between the first pivot member portion and an upper end of arm 16L. Since bolt 42 must withstand forces from a collision, it should be relatively strong. Bolt 42 may be considered to be a pivot member portion attaching member 22L at an anchor defined by clevis 40. If desired, the bolt 42 could be replaced by, for example, a three inch diameter round pipe (not shown) having bolts across diameters at opposite ends to block the pipe from moving off clevis 40.

Considering now FIG. 1 and FIG. 6 generally and other of the figs. as the discussion proceeds, the operation of the present invention will be discussed. As illustrated in FIG. 1, a truck 50 is just beginning to hit the bumper 12. With reference to FIG. 2 momentarily, the truck 50 would be hitting the bumper member 14 and, possibly, arms 16R and 16L, cross braces 18R and 18L, and back braces 20R and 20L. Importantly, the upper end of arms 16L and 16R would be above the front end of the impinging vehicle 50 as shown in FIG. 1. Thus, the impinging vehicle 50 would not directly smash into the breakable link 32L (FIGS. 3 and 4 only) or the similar breakable link on the right side.

If the vehicle 50 is being driven at a sufficiently slow speed relative to the trailer 10, the bumper 12 will function in normal fashion by opposing the front force of the vehicle 50. However, if the vehicle 50 is being driven at a sufficiently high rate of speed relative to trailer 10, the left breakable link 32L and corresponding right breakable link would break at the notches 34 (refer momentarily to FIG. 3). Preferably, the breakable links would break when about 40,000 lbs. of force is applied. It is generally thought that a bumper which withstands 40,000 lbs. of force is about the maximum which can reasonably be used without necessarily severely injuring occupants of the impinging vehicle 50. Accordingly, the breakable links would break when about that much force was applied to the bumper member 14 and associated structures. The force of the vehicle 50 hitting the bumper 12 creates a downward force pulling the arms 16L and 16R downward and away from the floor of the semi-trailer 10. This downward force, which is different in value than the 40,000 lbs. of force applied by the vehicle 50, is the actual force which would ordinarily sever the breakable links such as 32L. In other words, the breakable links are designed to break when 40,000 lbs. of force are applied to the bumper member 14, not when 40,000 lbs. of force are applied directly to the breakable links.

If the breakable links are broken without deforming the structure of bumper 12, they may be easily replaced by bolting a new link, such as 32L, in place by bolts 30 and 36 (see FIG. 3).

Turning now primarily to FIG. 6, the breaking of the breakable links allows the bumper 12 to pivot clockwise about pivot point or axis 24L (there is a similar pivot point collinear thereto on the right side of the vehicle). As the bumper 12 pivots clockwise about pivot point 24L, it tends to smash the front end of impinging vehicle 50 into the pavement with associated tremendous friction between the impinging vehicle and the pavement. The friction helps stop forward movement of the impinging vehicle before the passenger compartment underrides the truck. Quite importantly, the kinetic energy is being directed largely downward and not towards the passenger compartment of the vehicle 50. The kinetic energy of the collision is being absorbed largely by the smashing of the front end and the engine block of the vehicle 50. At the same time, the smashing down of the front of vehicle 50 as bumper 12 pivots about 24L tends to lift the rear of the trailer 10 as illustrated by the upward arrow. By having the energy cause the lifting up of the rear of trailer 10 and the smashing down of the front of the vehicle 50 with associated friction, the bumper 12 minimizes the direction of energy which might injure occupants of the vehicle 50 or the driver of the truck trailer 10. It should be readily appreciated that massive amounts of energy can be dissipated or absorbed by the lifting of the rear of the trailer 10. The actual amount in a particular case will, of course, depend upon the contents of the trailer 10. However, even if the trailer 10 is empty it is still sufficiently heavy that lifting it will absorb a large amount of energy.

Note that bumper 12 rotates through a swing angle S in FIG. 6 (angle between pre-crash position of brace 26L of FIG. 1 and its post-crash position of FIG. 6 or equivalently angle between pre-crash position of member 22L and its post-crash position). The pivot axis 24L is sufficiently above the ground (i.e., pavement on which the truck is disposed) that the portions of bumper 12 which swing about 24L can swing over angle S at least 30 degrees without the bumper striking the ground. More specifically, the bumper 12 can swing over an angle S greater than 35 degrees without the bumper striking the ground. Even more specifically, the bumper 12 can swing over an angle S greater than 40 degrees without the bumper striking the ground. Indeed, as shown in FIG. 6, the pivot axis 24L is at a height above the ground which is greater than the swing radius of bumper 12 (i.e., length of 22L corresponding to distance from 24L to remote tip of 22L). Thus, bumper 12 cannot swing into contact with the ground, but instead will smash the front end of impinging vehicle 50 into the ground. As used herein, the swing radius of a bumper is the radius from its pivot axis to the furthest point on the portion of the bumper which rotates, this radius being in a plane perpendicular to the pivot axis.

As also shown, the pivot axis 24L is closer to the back 10B of the vehicle than it is to the ground. It will also be seen in the drawings that the pivot axis 24L is closer to the rearmost point (not separately labeled) on bumper 12 than it is to the ground.

As shown the angle of inclined member 22L will preferably be (its pre-crash, normal position) 45 degrees relative to the horizon (i.e., meaning its angle relative to the horizon when the truck 10 is on level ground). More generally, the angle of inclined member 22L will be from 40 to 50 degrees relative to the horizon.

The various constraints discussed and shown relative to the height of pivot axis 24L, length and angle of member 22L, swing angle S, and swing radius help to cause and/or increase the tendency to smash down on the front of the impinging vehicle and lift up the truck 10. This smash down/lift up feature is quite important in avoiding or minimizing injuries. Upon a collision which severs the breakable links such as 32L, the kinetic energy is channeled into forces on the impinging vehicle having primarily vertical components. That is, at any given time following the severing of the links, the sum of vertical components of the collision forces on the impinging vehicle are larger than any horizontal components of collision forces on the impinging vehicle.

With reference back to FIG. 2, the bumper 12 has a large impact area to help widely distribute or spread the discussed smashing down/lifting up vertical collision forces as well as other forces. The impact area of the bumper 12 is the area over which the front of an impinging vehicle may contact portions of the bumper 12. Thus, FIG. 2 shows that this impact area includes the union of a triangle between member 14, arm 16L, and brace 18L and a triangle between member 14, arm 16R, and brace 18R. As shown, this impact area extends at right and left sides for a maximum height equal to the height of vertical arms 16L and 16R and extends for a middle height (i.e., where braces 18L and 18R cross) at least half the magnitude of the maximum height. (In the embodiment shown, the middle height is half the maximum height.) The height of the impact area between vertical arm 16L and the middle (i.e., where braces 18L and 18R cross) varies from the maximum to the middle height along the upper edge of 18L, whereas the height of the impact area between vertical arm 16R and the middle varies from the maximum to the middle height along the upper edge of brace 18R.

With reference back to FIGS. 1 and 6, it is noted that the maximum vertical height (i.e., pre-crash) of the portions of bumper 12 which swing upon breaking of the links is equal to the height of 16L. That maximum vertical height is at least 80% of the maximum depth of the portions of bumper 12 which swing upon breaking of the links. That maximum depth is the front to back horizontal offset between the tip of 22L adjacent axis 24L and the rearmost surface of arm 16L.

Turning now to the FIG. 7 simplified back view of a portion of an alternative bumper 112, it would be constructed identically to bumper 12 except for differences which will be noted. Bumper 112 has bumper member 114 and parallel horizontal upper member 150 with vertical middle member 152. This provides an impact area including at least the rectangle bounded by and between members 114 and 150 and arms 116L and 116R.

Turning now to the FIG. 8 simplified back view of a portion of an alternative bumper 212, it would be constructed identically to bumper 12 except for differences which will be noted. Bumper 212 has bumper member 214 and parallel horizontal upper and middle members 154 and 156 extending between arms 216L and 216R. This provides an impact area including at least the rectangle bounded by and between members 214 and 154 and arms 216L and 216R.

Although specific constructions have been discussed herein, it will be noted that these are for illustrative purposes only. Various adaptations and modifications will be apparent to those of skill in the art. For example, although the preferred embodiment uses identical right and left structures with two breakable links and two inclined members such as 22L, it will be appreciated that a less reliable version of the present invention might be constructed using a single breakable link and single inclined member such as 22L. In view of these and other possible modifications, the scope of the present invention should be determined by reference to the claims appended hereto.

What is claimed is:

1. An underride protection bumper for an elevated floor road vehicle comprising:

a framework including a bumper member at a first end;

a first pivot member portion at a second end of said framework; and a first breakable link at said first end for breakably securing said framework to the road vehicle; and wherein said framework further includes:

a first arm fixed to said bumper member and extending up therefrom to an upper end of the first arm; and a first inclined member having a lower end secured to said bumper member and an upper end; and wherein said first breakable link is attached to said upper end of said first arm and said first pivot member portion is mounted to said upper end of said first inclined member for pivotable attachment of said upper end of said first inclined member to a first anchor point, said first inclined member being inclined at an angle of 40 degrees to 50 degrees relative to a horizontal line; and wherein said first arm has a vertical extent greater than a vertical extent of said first breakable link, said upper end of said first arm is at a higher vertical level than said lower end of said first inclined member, and said first arm is operable to smash down on an impinging vehicle colliding into the underride protection bumper.

2. An underride protection bumper for an elevated floor road vehicle comprising:

a framework including a bumper member at a first end;

a first pivot member portion at a second end of said framework; and a first breakable link at said first end for breakably securing said framework to the road vehicle; and wherein said framework further includes:

a first arm fixed to said bumper member and extending up therefrom to an upper end of the first arm; and a first inclined member having a lower end secured to said bumper member and an upper end; and wherein said first breakable link is attached to said upper end of said first arm and said first pivot member portion is mounted to said upper end of said first inclined member for pivotable attachment of said upper end of said first inclined member to a first anchor point, said first inclined member being inclined at an angle of 40 degrees to 50 degrees relative to a horizontal line; and wherein said bumper has an impact area over which the front of an impinging vehicle may contact portions of the bumper, said impact area having a side height at two sides substantially equal to a height of said first arm and having a height of at least one half said side height throughout a separation between the two sides.

3. The underride protection bumper of claim 2 wherein the bumper has a swinging portion which pivots about an axis through said first pivot member portion and wherein said swinging portion includes said first arm, and wherein said first arm has a pre-crash maximum vertical extent that is at least 80% of a pre-crash maximum depth of the swinging portion.

4. The underride protection bumper of claim 3 wherein said framework further includes a first brace extending from adjacent said upper end of the first arm to a point on said first inclined member adjacent the upper end of said first inclined member.

5. The underride protection bumper of claim 3 wherein said framework further includes a second arm, a second inclined member, a second breakable link, and a second pivot member portion constructed and operable in identical fashion respectively to said first arm, said first inclined member, said first breakable link, and said first pivot member portion and mounted on an opposite side therefrom.

6. The underride protection bumper of claim 5 wherein said first pivot member portion is separate from said second pivot member portion.

7. The underride protection bumper of claim 5 wherein said framework further includes first and second crossbraces, each extending between an upper end of one of said first and second arms and a lower end of another of said first and second arms.

8. The underride protection bumper of claim 1 wherein said framework further includes a first brace extending from adjacent said upper end of the first arm to a point on said first inclined member adjacent the upper end of said first inclined member.

9. An elevated floor road vehicle comprising a road vehicle structure and an underride protection bumper including:

a framework including a bumper member at a first end;

a first pivot member portion at a second end of said framework; and a first breakable link at said first end for breakably securing said framework to the road vehicle; and wherein said framework further includes:

a first arm fixed to said bumper member and extending substantially vertically up therefrom to an upper end of the first arm; and a first inclined member having a lower end secured to said bumper member and an upper end; and wherein said first breakable link is attached to said upper end of said first arm and said first pivot member portion is mounted to said upper end of said first inclined member for pivotable attachment of said upper end of said first inclined member to a first anchor point, said first inclined member being inclined at an angle of 40 degrees to 50 degrees relative to a horizontal line and wherein said first pivot member portion and said first breakable link are mounted to the road vehicle structure; and wherein the bumper is operable, upon a front end of an impinging vehicle hitting said bumper member at a sufficiently high speed, to sever said first breakable link such that said bumper member and at least some other portions of said framework pivot about said first pivot member portion; and wherein said first pivot member portion is disposed relative to a lower edge of said bumper member such that pivoting of said bumper member and portions of the framework about said first pivot member causes the smashing down of the front end of the impinging vehicle with associated friction between the impinging vehicle and a road surface and tends to lift the road vehicle at a point adjacent to said first pivot member portion.

10. An elevated floor road vehicle comprising a road vehicle structure and an underride protection bumper including:

a framework including a bumper member at a first end;

a first pivot member portion at a second end of said framework and securing said framework to said road vehicle structure; and a first breakable link at said first end for breakably securing said framework to said road vehicle structure; and wherein the bumper is operable, upon a front end of an impinging vehicle hitting said bumper member at a sufficiently high speed, to sever said first breakable link such that said bumper member and at least some other portions of said framework pivot about said first pivot member; and wherein said first pivot member portion is disposed relative to a lower edge of said bumper member such that pivoting of said bumper member and portions of the framework about said first pivot member causes the smashing down of the front end of the impinging vehicle with associated friction between the impinging vehicle and a road surface and tends to lift the road vehicle at a point adjacent to said first pivot member portion, and wherein the portions of bumper which pivot about said first pivot member portion can swing over angle (S) of at least 30 degrees without the bumper striking the ground, wherein said bumper has an impact area over which the front of an impinging vehicle may contact portions of the bumper, said impact area having a side height at two sides substantially equal to a height of said first arm and having a height of at least one half said side height throughout a separation between the two sides.

11. The elevated floor road vehicle of claim 10 wherein said framework further includes:

a first arm fixed to said bumper member and extending up therefrom to an upper end of the first arm;

a first inclined member having a lower end secured to said bumper member and an upper end; and wherein said first breakable link is attached to said upper end of said first arm and said first pivot member portion is mounted to said upper end of said first inclined member and pivotably attaches said upper end of said first inclined member to a first anchor point.

12. The elevated floor road vehicle of claim 11 wherein said framework further includes a first brace extending from adjacent said upper end of the first arm to a point on said first inclined member between the upper and lower ends of said first inclined member.

13. The elevated floor road vehicle of claim 12 wherein said framework further includes a second arm, a second inclined member, a second breakable link, and a second pivot member portion constructed and operable in identical fashion respectively to said first arm, said first inclined member, said first breakable link, and said first pivot member portion and mounted on an opposite side therefrom.

14. The elevated floor road vehicle of claim 13 wherein said first pivot member portion is separate from said second pivot member portion.

15. The elevated floor road vehicle of claim 10 wherein said bumper has an impact area over which the front of an impinging vehicle may contact portions of the bumper, said impact area having a side height at two sides corresponding to a height of said first arm at two sides and having a height of at least one half said side height throughout a separation between the two sides.

16. The elevated floor road vehicle of claim 10 wherein the bumper has a swinging portion which pivots about an axis through said first pivot member portion and wherein said swinging portion has a pre-crash maximum vertical extent that is at least 80% of its pre-crash maximum depth.

17. The elevated floor road vehicle of claim 10 wherein the portions of bumper which pivot about said first pivot member portion can swing over angle (S) of at least 30 degrees without the bumper striking the ground.

18. The elevated floor road vehicle of claim 17 wherein the portions of bumper which pivot about said first pivot member portion can swing over angle (S) of at least 35 degrees without the bumper striking the ground.

19. The elevated floor road vehicle of claim 18 wherein the portions of bumper which pivot about said first pivot member portion can swing over angle (S) of at least 40 degrees without the bumper striking the ground.

20. An elevated floor road vehicle comprising a road vehicle structure and an underride protection bumper including:

a framework including a bumper member at a first end;

a first pivot member portion at a second end of said framework and securing said framework to said road vehicle structure; and a first breakable link at said first end for breakably securing said framework to said road vehicle structure; and wherein the bumper is operable, upon a front end of an impinging vehicle hitting said bumper member at a sufficiently high speed, to sever said first breakable link such that said bumper member and at least some other portions of said framework pivot about said first pivot member; and wherein said first pivot member portion is disposed relative to a lower edge of said bumper member such that pivoting of said bumper member and portions of the framework about said first pivot member causes the smashing down of the front end of the impinging vehicle with associated friction between the impinging vehicle and a road surface and tends to lift the road vehicle at a point adjacent to said first pivot member portion, and wherein the portions of bumper which pivot about said first pivot member portion can swing over angle (S) of at least 30 degrees without the bumper striking the ground; and wherein said first pivot member portion has a height above the road surface which is greater than a swing radius of the portions of bumper which pivot about said first pivot member portion.

21. The elevated floor road vehicle of claim 20 wherein said first inclined member is inclined at an angle of 40 degrees to 50 degrees relative to a horizontal line.

22. An elevated floor road vehicle comprising a road vehicle structure and an underride protection bumper including:

a framework including a bumper member at a first end;

a first pivot member portion at a second end of said framework and securing said framework to said road vehicle structure; and a first breakable link at said first end for breakably securing said framework to said road vehicle structure; and wherein the bumper is operable, upon a front end of an impinging vehicle hitting said bumper member at a sufficiently high speed, to sever said first breakable link such that said bumper member and at least some other portions of said framework pivot about said first pivot member; and wherein said first pivot member portion is disposed relative to a lower edge of said bumper member such that pivoting of said bumper member and portions of the framework about said first pivot member causes the smashing down of the front end of the impinging vehicle with associated friction between the impinging vehicle and a road surface and tends to lift the road vehicle at a point adjacent to said first pivot member portion, and wherein said first pivot member portion has a height above the road surface which is greater than a swing radius of the portions of framework which pivot about said first pivot member portion.

23. A method for blocking an impinging vehicle from underriding an elevated floor road vehicle, the steps comprising:

mounting an underride protection bumper to an elevated floor road vehicle, said bumper including:

a framework including a bumper member at a first end;

a first pivot member portion at a second end of said framework and securing said framework to said road vehicle structure; and a first breakable link at said first end for breakably securing said framework to said road vehicle structure;

severing said first breakable link upon a front end of an impinging vehicle hitting said bumper member at a sufficiently high speed such that said bumper member and at least some other portions of said framework pivot about said first pivot member;

smashing down of the front end of the impinging vehicle with associated friction between the impinging vehicle and a road surface by pivoting of said bumper member and said at least some other portions of said framework, the bumper member and framework remaining above the road surface through the smashing down step; and lifting the road vehicle at a point adjacent to said first pivot member portion by way of pivoting of said bumper member and said at least some other portions of said framework.

\* \* \* \* \*